US008078595B2

(12) United States Patent
King et al.

(10) Patent No.: US 8,078,595 B2
(45) Date of Patent: Dec. 13, 2011

(54) SECURE NORMAL FORMS (75) Inventors: Nigel King, San Mateo, CA (US);
George Buzsaki, Fremont, CA (US);
Roger Wigenstam, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 465 days.

(21) Appl. No.: 11/869,618

(22) Filed: Oct. 9, 2007

(65) Prior Publication Data

US 2009/0094193 A1 Apr. 9, 2009

(51) Int. Cl.
*G06F 7/00* (2006.01)
(52) U.S. Cl. .......................... 707/694; 707/702; 707/757
(58) Field of Classification Search .................. 707/757; 726/1, 26–30
See application file for complete search history.

(56) References Cited

U.S. PATENT DOCUMENTS

| 5,133,075 A | 7/1992 | Risch |
| 5,241,305 A | 8/1993 | Fascenda et al. |
| 5,276,901 A | 1/1994 | Howell et al. |
| 5,335,346 A | 8/1994 | Fabbio |
| 5,499,368 A | 3/1996 | Tate et al. |
| 5,748,899 A | 5/1998 | Aldrich |
| 5,787,428 A | 7/1998 | Hart |
| 5,832,226 A | 11/1998 | Suzuki et al. |
| 5,864,842 A | 1/1999 | Pederson et al. |
| 5,940,818 A | 8/1999 | Malloy et al. |
| 5,963,932 A | 10/1999 | Jakobsson et al. |
| 6,098,081 A | 8/2000 | Heidom et al. |
| 6,134,549 A | 10/2000 | Regnier et al. |

(Continued)

FOREIGN PATENT DOCUMENTS

EP 1 089 194 A2 4/2001

(Continued)

OTHER PUBLICATIONS

Stonebraker, Michael, et al., "Access Control in a Relational Data Base Management System by Query Modification", ACM Press, Proceedings of the 1974 Annual Conference, 1974, 8 pages.

(Continued)

*Primary Examiner* — John R. Cottingham
*Assistant Examiner* — Nicholas E Allen
(74) *Attorney, Agent, or Firm* — Hickman Palermo Truong & Becker LLP (57) ABSTRACT

Techniques for implementing secure normal forms are provided. In one embodiment, in response to a request for data from a client, a database server is operable to enforce a column-level security policy that is defined for a particular column of some, but not necessarily all, rows of a table stored in a database. After retrieving a set of rows from the table and before returning a result set of rows to the client, the database server modifies the retrieved set of rows into the result set of rows by applying the security policy to each row of the retrieved set of rows, where applying the security policy to a row comprises: determining whether the security policy is satisfied for the particular column of that row; replacing, in the result set of rows, a data value in the particular column of that row with a security-NULL value when the security policy is not satisfied; and including the data value in the particular column of that row into the result set of rows when the security policy is satisfied. After generating the result set of rows, the database server returns the result set of rows to the client.

22 Claims, 3 Drawing Sheets

U.S. PATENT DOCUMENTS

| | | |
|---|---|---|
| 6,253,203 B1 | 6/2001 | O'flaherty et al. |
| 6,275,824 B1 | 8/2001 | O'Flaherty et al. |
| 6,275,825 B1 | 8/2001 | Kobayashi et al. |
| 6,308,273 B1 | 10/2001 | Goertzel et al. |
| 6,363,387 B1 | 3/2002 | Ponnekanti et al. |
| 6,449,609 B1 | 9/2002 | Witkowski |
| 6,487,552 B1 | 11/2002 | Lei et al. |
| 6,493,722 B1 | 12/2002 | Daleen et al. |
| 6,539,398 B1 | 3/2003 | Hannan et al. |
| 6,578,037 B1 | 6/2003 | Wing et al. |
| 6,587,854 B1 | 7/2003 | Guthrie et al. |
| 6,609,121 B1 | 8/2003 | Ambrosini et al. |
| 6,618,721 B1 | 9/2003 | Lee |
| 6,631,371 B1 | 10/2003 | Lei et al. |
| 6,678,822 B1 | 1/2004 | Morar et al. |
| 6,684,227 B2 | 1/2004 | Duxbury |
| 6,757,670 B1 | 6/2004 | Inohara et al. |
| 6,763,344 B1 | 7/2004 | Osentoski et al. |
| 6,820,082 B1 | 11/2004 | Cook et al. |
| 6,847,998 B1 | 1/2005 | Arcieri et al. |
| 6,920,457 B2 | 7/2005 | Pressmar |
| 6,986,060 B1 | 1/2006 | Wong |
| 6,996,557 B1 | 2/2006 | Leung et al. |
| 7,155,612 B2 | 12/2006 | Licis |
| 7,240,046 B2 * | 7/2007 | Cotner et al. ............... 707/769 |
| 7,243,097 B1 | 7/2007 | Agrawal et al. |
| 7,266,699 B2 | 9/2007 | Newman et al. |
| 2001/0021929 A1 | 9/2001 | Lin et al. |
| 2002/0095405 A1 | 7/2002 | Fujiwara |
| 2003/0014394 A1 * | 1/2003 | Fujiwara et al. ............... 707/3 |
| 2003/0236781 A1 | 12/2003 | Lei et al. |
| 2003/0236782 A1 | 12/2003 | Wong et al. |
| 2004/0139043 A1 | 7/2004 | Lei et al. |
| 2004/0254948 A1 | 12/2004 | Yao |
| 2005/0050046 A1 | 3/2005 | Puz et al. |
| 2005/0177570 A1 | 8/2005 | Dutta et al. |
| 2005/0188421 A1 | 8/2005 | Arbajian |
| 2005/0246338 A1 | 11/2005 | Bird |

FOREIGN PATENT DOCUMENTS

| | | |
|---|---|---|
| EP | 2002312220 | 10/2002 |
| JP | 2002-312220 | 10/2002 |

OTHER PUBLICATIONS

State Intellectual Property Office of P.R.C., "Notification of the First Office Action", Application No. 200380108699.3, mailed Oct. 26, 2007, 9 pages.

State Intellectual Property Office of P.R.C., "Notification of the Second Office Action", Application No. 200380108699.3, mailed Feb. 1, 2008, 9 pages.

Claims, Application No. 200380108699.3, 4 pages.

Oracle Corporation, "Oracle9iR2 Database Security for E-Business", An Oracle White Paper, Jan. 2002.

WHATIS.COM, "The Most Misunderstood Terms in IT", Tech Target, retrieved from www.archive.org, dated Jun. 27, 2002, 5 pages.

Stonebraker, M., et al., "Access Control in a Relational Data Base Management System by Query Modification" XP-002319462, pp. 180-186.

Motro, A., "An Access Authorization Model for Relational Databases Based on Algebraic Manipulation of View Definitions" (1989) IEEE, pp. 339-347.

* cited by examiner

SECURE NORMAL FORMS

FIELD OF THE INVENTION

The present invention generally relates to query processing. The invention relates more specifically to techniques for implementing secure normal forms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Normalization is a design technique that is used to structure relational database tables. As used herein, "normal form" refers to a structural organization that indicates the relationships among the columns of a database table or tables. For example, the most commonly used normal forms are first, second, and third normal forms. A relational table would be in first Normal Form (1NF) when the table is configured to store atomic values in all of its columns and a set of columns is designated as a primary key, where the values of the primary key uniquely identify the values in the rest of the columns across all rows in the table. A relational table that is in first normal form would be converted to second Normal Form (2NF) by removing to separate table or tables the columns that are configured for storing subsets of data that is associated with multiple rows of the table, and then creating foreign key columns in the separate table or tables for linking back to the table. A relational table that is in second normal form would be converted to third Normal Form (3NF) by removing columns from the table that do not depend on the entire set of primary key columns. Normalization of relational database tables is typically used to reduce data duplication and to avoid various types of logical inconsistencies that may cause loss of data integrity when data is inserted, updated, and deleted from a table.

If conventional normalization techniques are applied and a relational table is created in third normal form, all data rows stored in the table would be identifiable by the values stored in the primary key columns. However, the data rows stored in the relational table would not depend in any way on security policies that may need to be applied to certain columns of the table. For example, some columns of a relational table in third normal form may store sensitive data access to which may need to be restricted (e.g. salary data, credit card numbers, etc.), while other columns of the table may store non-sensitive data access to which need not be restricted (e.g. name, telephone number, etc.) However, the conventional normalization techniques do not provide any mechanisms or rules that would allow different columns with different security policies to be stored in the same relational table, even though the table may be properly designed in third normal form and values in each of the different columns may be uniquely identifiable by nothing else but the values in the primary key columns.

For example, consider an employee directory that is designed as a relational table organized in third normal form. A particular employee may be represented as a row in the relational table, where the various attributes of the employee (e.g., name, position, phone number, Social Security Number, date of birth, salary, etc.) are stored as separate columns in the table. In this example, some of the attribute data for the particular employee is sensitive (e.g., Social Security Number, date of birth, salary), and accordingly must be made available only to authorized users such as the manager of the employee. On the other hand, access to the non-sensitive attribute data for the employee (e.g., name, position, and phone number) should be made available without restriction to facilitate easier communication among employees. However, if the employee directory table is created and stored in third normal form, then the sensitive and non-sensitive employee data would be stored as columns in the same table. In turn, this would create a security problem because sensitive and non-sensitive employee data needs to be accessed according to different security rules and policies.

To address this security problem, after the employee directory table is designed as a single relational table in third normal form, one past approach provides for separating the columns storing sensitive and non-sensitive employee data and then creating the separated columns in two or more different tables. Then, existing database security mechanisms are used to assign different permissions to the two or more different tables, and these permissions are subsequently used to control access to these tables. One serious disadvantage of this approach is that it violates the third normal form principle and thus increases data redundancy. Another serious disadvantage of this approach is that referential integrity needs to be additionally enforced between the different tables that store employee data in order to provide for data integrity and prevent logical inconsistencies in the database (for example, rows representing a particular employee must be deleted from all tables that store employee data when an employee leaves the company.)

Another approach to address the above security problem is to entrust front-end applications and/or clients with enforcing the security policies that control access to sensitive and non-sensitive employee data. For example, the employee directory table may be designed and created as a single relational table in third normal form to include columns storing both sensitive and non-sensitive employee data. Thereafter, it would be up to the front-end applications to check and determine whether a particular user that issues a request has the permissions to access the sensitive employee data. One serious disadvantage of this approach is that different front-end applications may not implement in a uniform and consistent way the security policies that control access to the sensitive and non-sensitive employee data. For example, some front-end applications may consider date-of-birth data as non-sensitive data, while other front-end applications may consider the same data as sensitive. Another serious disadvantage of this approach is that any user (e.g. a database administrator or an intruder) who gains direct access to the employee directory table through a database client API or a query tool would be able to retrieve sensitive employee data as long as that user has sufficient permissions to access the table.

Based on the foregoing, techniques for implementing secure normal forms are needed that overcome the disadvantages of the approaches described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A real-world entity may be represented in relational databases as one or more tables, where an occurrence of the entity may be represented by a row or rows stored in the one or more tables. An entity may be associated with one or more attributes, where attribute data of an entity occurrence may be stored in one or more columns of the corresponding row or rows in the one or more tables. For example, employees of a company may be considered an entity that is represented in an employee table, where each employee may be associated with an address attribute. The address attribute may be represented by separate columns (e.g., "address_line", "city", "state", "zip") in the employee table. For example, data associated with employee John Doe would be an entity instance and would be stored as a particular row in the employee table; the particular row would store the address attribute associated with the employee (e.g., "555 Cedar Street", "San Jose", "Calif.", "95112") in the corresponding "address_line", "city", "state", "zip" columns.

As used herein, "server" refers to one or more software components which, when executed, may be allocated computational resources, such as memory, CPU time, and/or disk storage space in order to perform one or more functionalities. "Database server" refers to a server that is operable to perform various functionalities against one or more databases. For example, by utilizing its allocated resources, a database server may be operable to perform various data management functions (including, but not limited to, controlling and facilitating access to particular databases, processing requests by clients to access particular databases, and processing requests by clients to add, delete, or modify data in particular databases), as well as database management functions (including, but not limited to, creating databases and tables, allocating disk space for databases and tables, and creating and maintaining user login information, role information, and security policy information). In clustered operational environments, a database server may be a server instance that operates as part of a cluster of database server instances that is operable to perform data management functions and database management functions against one or more databases.

General Overview

Techniques for implementing secure normal forms are described herein. In one embodiment, in response to a request for data from a client, a database server is operable to enforce a column-level security policy that is defined for a particular column of some, but not necessarily all, rows of a table stored in a database. After retrieving a set of rows from the table and before returning a result set of rows to the client, the database server (or a component thereof) modifies the retrieved set of rows into the result set of rows by applying the security policy to each row of the retrieved set of rows, where applying the security policy to a row comprises: determining whether the security policy is satisfied for the particular column of that row; replacing, in the result set of rows, a data value in the particular column of that row with a security-NULL value when the security policy is not satisfied; and including the data value in the particular column of that row into the result set of rows when the security policy is satisfied. After generating the result set of rows, the database server returns the result set of rows to the client.

The techniques described herein allow the representation of entities to be structured in a relational database in a way that does not require the breaking up of otherwise normalized entity attributes into columns of separate tables. For example, the techniques described herein allow a table, having columns for which column-level security is defined, to be structured and stored in third normal form. When a user with access privileges to this table requests data from the table, the data from the columns with column-level security is filtered by applying the defined security policy or policies on a row-by-row basis before any results are returned to the user.

The techniques described herein also provide for a mechanism that allows access to entity data to be controlled based on one or more of: entity occurrences (as represented by rows stored in the table); roles defined at the database schema level that can be granted access to the tables defined in the schema; privileges associated with the roles; and entity attributes with which the privileges are associated. This mechanism also allows the attributes of one or more entities to be grouped based on common security and/or access policies. For example, the multiple different attributes of one or more entities may be assigned to or associated with the same security policy; according to the techniques described herein, that security policy would be uniformly enforced at the database level whenever data from any of the multiple different attributes of the one or more entities is requested. In this manner, the techniques described herein allow enforcement of security policies to be removed from front-end applications and to be performed directly by a database server. This allows security policies to be enforced consistently and avoids security breaches that may occur if a database is accessed through means (e.g., database client APIs and direct query tools) that are not and/or cannot be configured to enforce security policies.

Security-Null Value

According to the techniques described herein, a database server is operable to retrieve a set of rows from a database and, before returning any results, to generate a result set of rows by applying column-level security policies to the retrieved set of rows on a row-by-row basis. When a security policy is not satisfied for a particular column of a row from the retrieved set of rows, the database server (and/or a component thereof) would replace the data value in that particular column of that row with a security-NULL value; when the security policy is satisfied, the database server and/or the component thereof would include the data value in that particular column of that row in the result set of rows. After generating the result set of rows in this manner, the database server would return the result set of rows to the client that requested it.

As used herein, "security-NULL" value refers to a NULL value that indicates to a client that requested data, which would otherwise may be included in a result set of rows returned to the client, is not returned because one or more security policies are not satisfied for the particular column and row in which the requested data is stored. According to the techniques described herein, a security-NULL value has all the properties of an ordinary NULL value, but differs from an ordinary NULL value by having an additional property.

The additional property of a security-NULL value is the ability to convey to a client the information that the data value in a particular column in a particular row of a set of rows is not available to the client because of security-related reasons as opposed to being unavailable for other reasons. By providing a security-NULL value, the techniques described herein allow clients and other database applications that communicate with a database server to determine whether data values are removed from a returned set of rows because of security-related reasons or are unavailable because of other non-security reasons In one embodiment a security-NULL value behaves like an ordinary NULL value in arithmetic and other database operations including, but not limited to, addition, subtraction, multiplication, division, IS NULL operation, and IS NOT NULL operation. In addition, on the bit level the security-NULL value has one dedicated bit which is set to "1". The dedicated bit is at a predetermined location within the security-NULL value and, when set to "1", specifies the additional property of indicating data unavailability because of security-related reasons. In this embodiment, a client that receives a result set of rows from a server may detect the security-NULL value by checking the dedicated bit and may take appropriate actions (e.g. by displaying to a user an appropriate visual representation of the security-NULL value such as, for example, "NULL#").

In one embodiment, a database client API may provide an API call for checking whether a given value is a security-NULL value. For example, the database client API may include the function "IS_MASKED(input-value)", which function when executed with a given value as input parameter would return "TRUE" when the input parameter is a security-NULL value and "FALSE" otherwise. Other embodiments may provide a client with different mechanisms for checking whether a given value is a security-NULL value.

Column-Level Security Policies

As used herein, "security policy" refers to a set of metadata information that specifies one or more conditions that indicate permissions for accessing data stored in a database. "Column-level" security policy refers to a set of metadata information that specifies one or more conditions that indicate permissions for accessing data values stored in particular columns of particular rows in one or more tables.

According to the techniques described herein, a database server or a component thereof is operable to evaluate the conditions specified in a security policy on a row-by-row basis over rows that are retrieved from a database table but are not yet returned to a client. When the one or more conditions of the policy are satisfied for a particular column in a particular row, the database server includes the data value stored in that particular column in the result set of rows that is to be returned to the client; otherwise, the database server replaces the data value in the result set of rows with a security-NULL value.

By providing for enforcement of column-level security policies centrally at the database server, the techniques described herein facilitate a new mechanism for designing information models and structuring information in relational databases. This new mechanism is referred to and explained hereinafter as a "Secure Normal Form". The Secure Normal Form mechanism allows database developers to design and define column-level security policies that allow only specified users or groups of users to access certain data without the need for the database developers to define additional structures and to implement additional mechanisms for enforcing these security policies. For example, without implementing additional policy-enforcement mechanisms, a database developer may define a column-level security policy to allow a manager to view the salary information only of the manager's subordinates but not the salary information of any other employees that do not report to that manager. In another example, without implementing additional policy-enforcement mechanisms, a database developer may define a column-level security policy to allow a user who belongs to a benefits administration role to view the Social Security numbers of only those people for whom the user manages various benefits.

In one embodiment, database users may be provided with a mechanism to express a security policy in terms of one or more entity attributes. In this embodiment, the mechanism would map such attribute-level security policy to each column in one or more tables that stores a data value represented by the one or more entity attributes. In this manner, the same security policy can be associated with multiple columns in multiple tables, while at same time allowing database users to manage the permissions expressed in the security policy from a singe location relative to the one or more entity attributes.

In one example, suppose that employee data is stored in an employee table that stores data for an employee entity that includes a salary attribute. In the employee table, an employee would be represented by a particular row that includes a "salary" column. At the entity level, an attribute-level security policy may be defined as follows:

Only employees belonging to the Human Resources department are allowed to view the salary attribute of other employees.

At the table level, the "salary" column in the employee table may be associated with a specific set of permissions that are granted to a database user group assigned only to employees in the Human Resources department. Thus, the above attribute-level security policy may be mapped to the following conditions associated with the "salary" column in the employee table:

GROUP_ID=100 where "100" is the identifier of the database user group assigned to the employees in the Human Resources department. When a user sends a query requesting the data in the employee table, according to the techniques described herein the database server may enforce the above column-level security policy in the following manner. First, from the security context associated with the client through which the user submitted the query, the database server determines the user ID of the user and any user groups that the user is assigned to. If the user has permissions to access at least some data in the employee table, the database server retrieves the set of data that is requested in the received query. Then, according to the techniques described herein, the database server or a component thereof evaluates the above security policy for each row in the retrieved set of rows. If the user is associated with the user group identified by group ID "100", then the set of rows is returned to the client for presenting to the user; otherwise, the database server or the component thereof replaces with security-NULL values the data values in the "salary" column of the returned set of rows, and the resulting set of rows is then sent back to the client.

In another example, consider an employee table that stores employee salary data in a "salary" column and the title of each employee in a "position" column. In this example, a column-level security policy may be specified only for particular rows within the employee data—that is, only for particular occurrences of the employee entity. For example, a column-level security policy may be specified to restrict access to the salary of the Chief Executive Officer (CEO) and the Chief Financial Officer (CFO) only to the members of the Board of Directors. Supposing that each member of the Board of Directors is assigned to the database user group with group ID "10", then the column-level security policy may be expressed as follows:

GROUP_ID=10 and (employee.position in ("CEO", "CFO"))

This column-level security policy may be enforced by a database server or a component thereof in the following manner. First, from the security context associated with the client through which a user submits a query to access the employee data, the database server determines the user ID of the user and any user groups that the user is assigned to. If the user has permissions to access at least some data in the employee table, the database server retrieves the set of data that is requested in the received query. Then, according to the techniques described herein, the database server or a component thereof evaluates the above security policy for each row in the retrieved set of rows. If the user is associated with the user group identified by group ID "10" and the particular row stores the values "CEO" or "CFO" in the "position" column, then the salary data stored in the "salary" column of the particular row is returned to the client for presenting to the user; otherwise, the data value in the "salary" column of that particular row is replaced with the security-NULL value. (It is noted that the database server or the component thereof may also evaluate other column-level security policies over each row of the retrieved set of rows—for example, a column-level security policy that allows access to the "salary" column only for employees of the Human Resources department; however, evaluating any such other column-level security policies would still not allow anyone except a user assigned to user group with group ID "10" to retrieve the salary data from the rows that store the values "CEO" and "CFO" in the "position" column of the employee table.)

According to the techniques described herein, a column-level security policy may be expressed as a permission to view a particular column in a particular subset of the rows stored in a table. In some embodiments implemented in a relational database server, predicates in the "WHERE" clause of Structured Query Language (SQL) queries can be used to determine the subset of rows for which a column-level security policy is to be applied. For example, a column-level security policy may be used to restrict access to a column in a particular table based on the security context of the database connection over which a query is sent to the database server. Such column-level security policy may be expressed as follows:

MANAGER_ID=$CURRENT_USER where "$CURRENT_USER" is a system database function that returns the user ID associated with the database connection over which a query is sent, and "MANAGER_ID" is column in the particular table that stores in each row of the table the user ID of a database user that is allowed to access the data stored in some (or all) columns of that row.

According to the techniques described herein, a column-level security policy may also be expressed as a permission to view one or more columns in one or more particular rows that are stored in a table. The one or more particular rows may be identified using any means that a database server may use to identify a row in a table including, but not limited to, a primary key value, an index value, a SEQUENCE value (e.g., a value of a sequence datatype that is an ever-increasing number automatically stored in a designated column of a table), and a ROWID value (e.g., an address value that is stored as a pseudo-column in a table and that is used internally by a database server to uniquely identify the location of rows in the table).

The techniques described herein provide for a database server that is operable to enforce column-level security policies in a centralized manner. Thus, the enforcement of column-level security policies may be combined with other security mechanisms that can be enforced by a database server such as, for example, database access permissions, table access permissions, and row-level security policies used for restricting the rows that can be returned to a user. In this manner, the techniques described herein can guarantee that no matter what type of mechanism (e.g., an application, query tool, database client API, etc.) a user may use to access a particular database, a database server would always return to the user only that data from the database which the user has permissions to access.

Storing Column-Level Security Policies

In some embodiments, security policies may be stored in one or more database objects within a database. For example, the database objects storing security policies may be tables, views, materialized views, indexes, or any other data structures that a database server can create and maintain as part of a database schema. In other embodiments, security policies may be stored and maintained by a database server in data structures that are outside of a database, for example, in files stored in an Operating System (OS) file system. According to the techniques described herein, security policies may be stored in any storage medium that can be accessed by a database server and in any format that a database server can process.

Functional Description of an Example Embodiment

Figure 1:
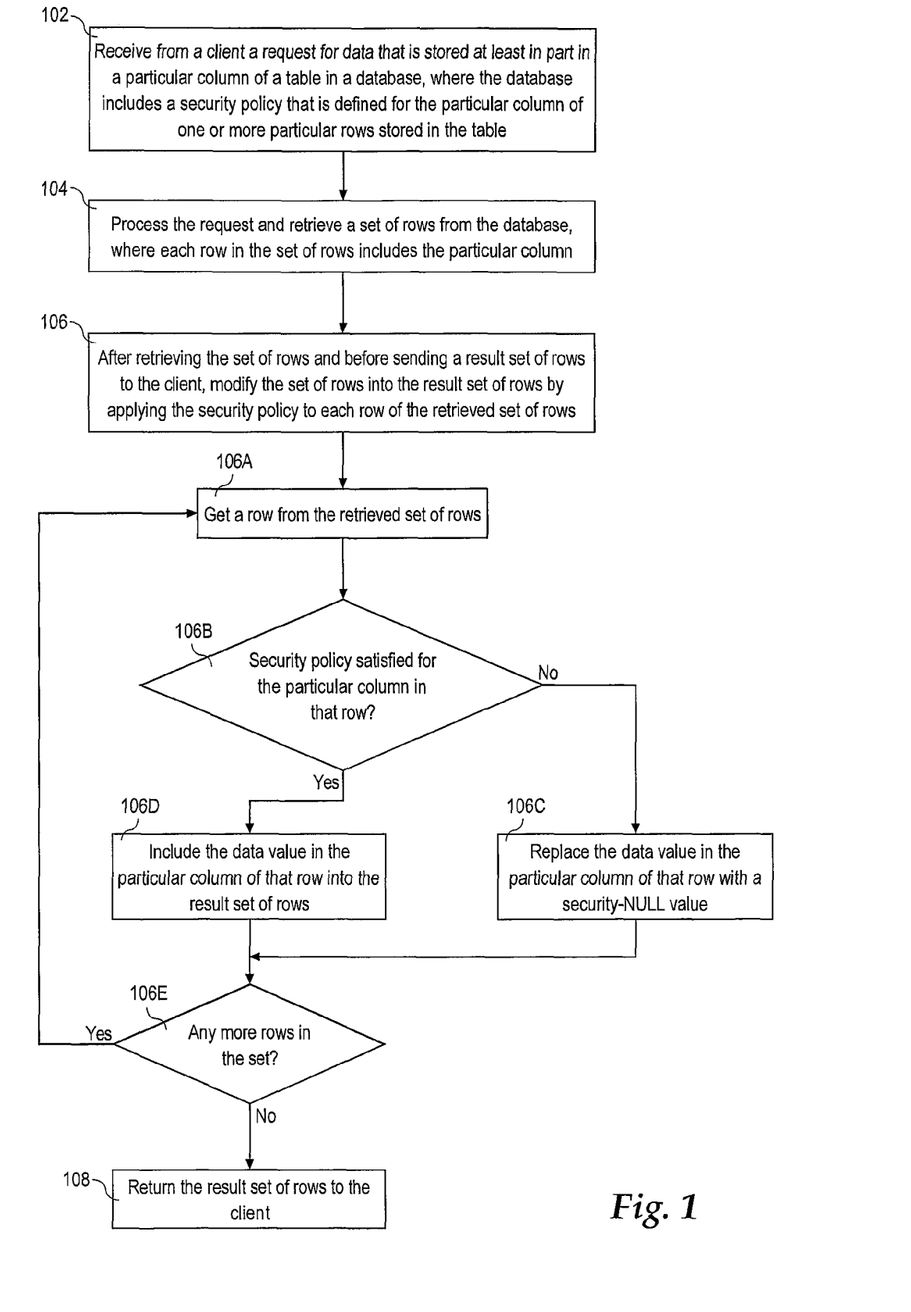
FIG. 1 is a flow diagram that illustrates an overview of a method of processing data according to one embodiment.

FIG. 1 is a flow diagram that illustrates an overview of a method of processing data according to one embodiment of the techniques described herein.

In step 102, a database server receives from a client a request for data that is stored at least in part in a particular column of a table. The database in which the table is stored may be a relational database that also includes a security policy, which is defined for the particular column of one or more particular (but not necessarily all) rows stored in the table.

In step 104, the database server or component thereof processes the request and retrieves a set of rows from the database. Each row in the set of rows includes the particular column and a data value that is stored therein. In processing the request for data, the database server executes the request against the database without semantically modifying the request to retrieve different data than the data specified in the request. In one operational scenario, the request may be a SQL query. Prior to executing the SQL query, the database server does not semantically modify the query by including operators or functions that are operable to mask or otherwise change any data values that would be retrieved by the query. In another example operational scenario, the request may be a database API call to retrieve a particular set of data. Prior to executing the API call, the database server does not modify the call in any way that is operable to change any data values that would be retrieved from the database.

After retrieving the set of rows specified in the received request, and before sending any results to the client that sent the request, in step 106 the database server modifies the retrieved set of rows into a result set of rows that is going to be sent to the client in response to the request. The database server modifies the retrieved set of rows by applying the security policy to each row in the set, as described hereinafter in steps 106A to 106E.

In step 106A, the database server or a component thereof accesses a particular row in the retrieved set of rows.

In step 106B, the database server or the component thereof determines whether the security policy is satisfied with respect to the particular column in the particular row being processed. For example, the database server or the component thereof may evaluate whether one or more conditions specified in the security policy are satisfied with respect to the particular row.

If the security policy is not satisfied for the particular row that is being processed, then in step 106C the database server or the component thereof replaces the data value in the particular column of that row with a security-NULL value.

If the security policy is satisfied for the particular row that is being processed, then in step 106D the database server or the component thereof stores (and/or otherwise include) the data value in the particular column of that row into the result set of rows.

In step 106E, the database server or the component thereof checks to determine whether there are any more rows in the retrieved set of rows. If the retrieved set of rows includes any rows to which the security policy has not yet been applied, then the database server or the component thereof proceeds with step 106A to get the next row and apply the security policy thereto.

After the database server or the component thereof applies the security policy to each row in the retrieved set of rows, in step 108 the database server returns the generated result set of rows to the client that sent the request for data.

For illustration purposes only, the method in FIG. 1 is described with respect to one security policy that is defined for one column of one table in a relational database. However, the techniques described herein are not in any way limited to applying only one security policy defined for one column in one table.

For example, according to the techniques described herein a database server may generate a result set of rows by applying the same security policy to more than one column of the retrieved set of rows. In another example, a database server may generate a result set of rows by applying two or more different security policies with respect to the same column of the retrieved set of rows. In another example, a database server may generate a result set of rows by applying one or more security policies with respect to one column of the retrieved set of rows and different one or more security policies with respect to another column of the retrieved set of rows. Further, the columns with respect to which the database server applies the security policies may be included in the retrieved set of rows from the same or different tables that are each stored in the same or different relational databases.

For the above reasons, the techniques described herein are not limited to applying any particular number of security policies with respect to any particular number of columns in any particular number of tables. In general, the techniques described herein are applicable to any set of data that can be retrieved by a database server from a database in response to any type of query or other data request. Thus, the examples provided in the present disclosure are to be regarded in an illustrative rather than a restrictive sense.

Operational Example in One Embodiment

Figure 2:
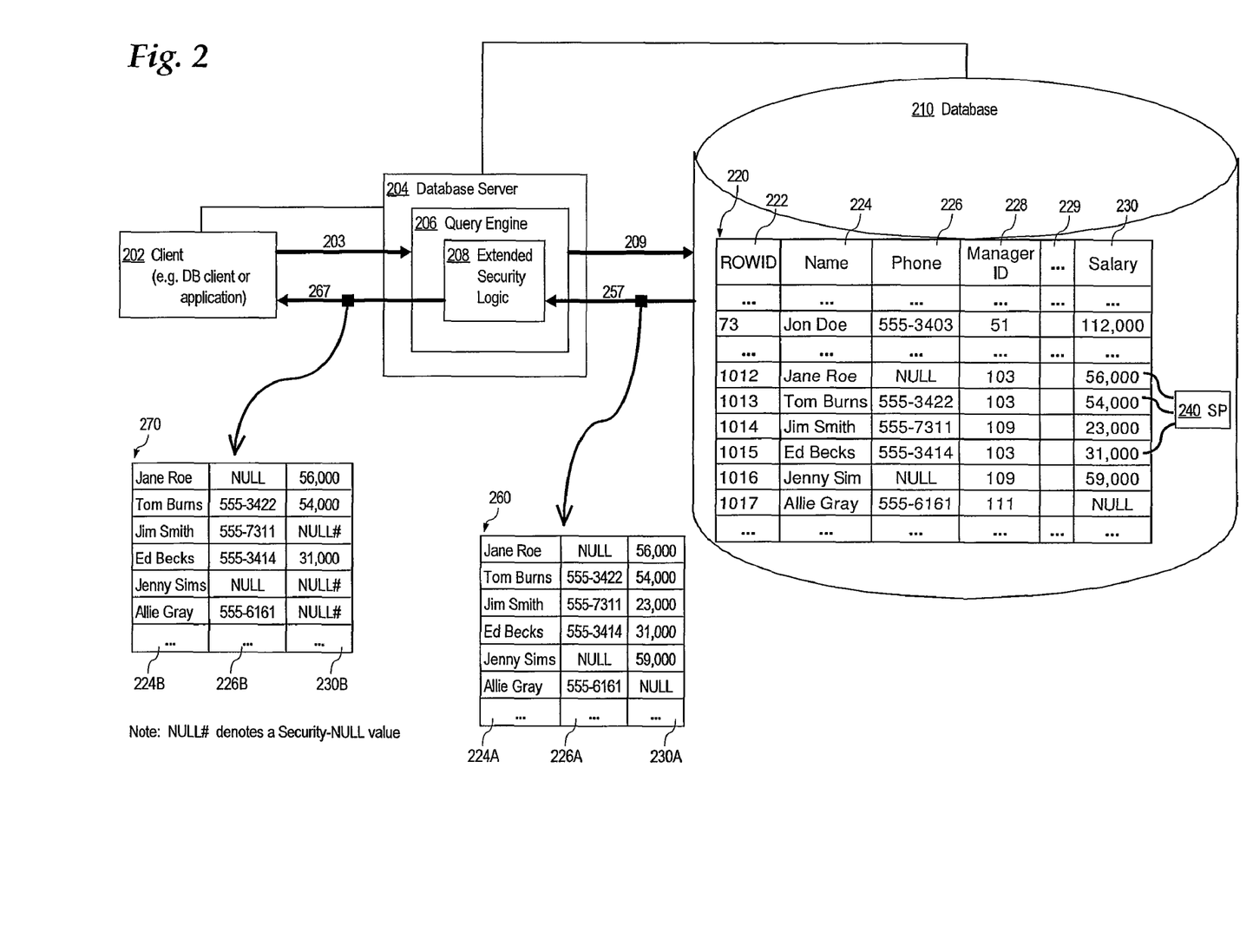
FIG. 2 is a block diagram that illustrates an operational example of a database server processing data according to one embodiment.

FIG. 2 is a block diagram that illustrates an operational example of a database server processing a query for data according to one embodiment. One or more clients, such as client 202, are communicatively and/or operatively connected to database server 204. Database server 204 is operable to perform data management and database management functions for one or more databases, such as database 210.

In the embodiment illustrated in FIG. 2, client 202 may be implemented as a set of instructions which, when executed by one or more processors, are operable to send queries or other requests for data to database server 204 and to receive result sets of rows from the database server. Client 202 may receive the queries or other requests for data directly from users and/or from various computer processes, services, or servers. For example, client 202 may be a database application or a query tool that is operable to send queries to database server 204. In another example, client 202 may be a client component that is operable to request data by making calls over a database client API provided by database server 204. Techniques described herein are not limited to any particular type of client and may be implemented for any entity that is operable to send requests for data to, and to receive result sets of rows from, a database server such as database server 204.

Database server 204 comprises query engine 206. Query engine 206 may be implemented as a set of instructions which, when executed by one or more processors, is operable to: process requests for data received from a client, such as client 202; retrieve the requested data from one or more databases, such as database 210; and to return the retrieved data to the client. For example, in the embodiment illustrated in FIG. 2, query engine 206 may be a SQL interpreter module that is operable to: parse and compile SQL queries received at database server 204; generate execution plans or other operator trees that may be used to execute the received queries; execute or cause the execution of the received queries at least against database 210 and retrieve the requested sets of rows therefrom; and return the sets of rows to the client or clients that sent the queries. In some embodiments, a query engine such as query engine 206 may be operable to process queries conforming to a specific query language such as SQL; in other embodiments, a query engine may be operable to process queries written in any of several query languages such as, for example, SQL, XQuery, XQueryX, and XPath. This, techniques described herein are not limited to any particular type of query engine that may be implemented in a database server such as database server 204.

In the embodiment illustrated in FIG. 2, query engine 206 comprises extended security logic 208. Extended security logic 208 may be implemented as a set of instructions which, when executed by one or more processors, is operable to apply security policies according to the techniques described herein. For example, before sending to a client a set of rows that is retrieved by query engine 206 from a database, extended security logic 208 may be operable to apply one or more security policies to each row in the retrieved set of rows. When extended security logic 208 determines that a security policy is satisfied for a particular row, then extended security logic 208 stores the data values from the columns to which that security policy is defined in a result set of rows that is to be returned to the client. When the security policy is not satisfied for a particular row, then extended security logic 208 replaces the data values from the columns to which that security policy is defined with security-NULL values in the result set of rows.

In addition to extended security logic 208, query engine 206 may comprise other components that may be operable to enforce other database security mechanisms in conjunction with the techniques described herein. For example, query engine 206 may comprise a component that is operable to add predicates to the "WHERE" clauses of received SQL queries before the SQL queries are executed. These predicates may be based on the security contexts of database connections over which the SQL queries are sent and may operate as row-level filters to prevent retrieval from the database of rows which the corresponding security context does not have permissions to access.

In the embodiment illustrated in FIG. 2, database 210 may be a relational database. In other embodiments, a database server such as database server 204 may implement the techniques described herein against any other type of database from which the database server is operable to retrieve data, such as, for example, a repository that comprises XML documents.

Database 210 comprises relational table 220. For illustration purposes, only one table is illustrated as being stored in database 210. However, it is noted that database 210 is not limited to storing any particular number of tables or other database objects with which security policies may be associated (e.g., materialized views and other database storage containers).

Table 220 is named "employees", and comprises column 222 (named "ROWID"), column 224 (named "Name"), column 226 (named "Phone"), column 228 (named "Manager ID"), column 230 (named "Salary"), and other columns as indicated by ellipsis 229. As illustrated in FIG. 2, table 220 includes columns that store both sensitive data (e.g. column 230) and non-sensitive data (e.g. columns 224, 226, and 228). For example, the salary of employee "Jane Roe" is stored in column 230 as "56,000" and her phone number is currently not known as indicated by the "NULL" value stored in column 226. Similarly, the salary of employee "Tom Burns" is stored in column 230 as "54,000" and his phone number is stored in column 226 as "555-3422". (The ellipses in table 220 are used to illustrate that an arbitrary number of other rows may also be stored in the table.)

As an operational example, suppose that column-level security policy 240 is defined for column 230 ("Salary") in table 220. Security policy 240 requires that An employee's salary can be viewed by the managers in that employee's line of management.

At the column-level of table 220, security policy 240 may be represented by the following condition that is associated with column 230 ("Salary"):

employees.MANAGER_ID=GROUP_ID

This condition of security policy 240 indicates that for each row of table 220, the value of the column 230 ("Salary") may be viewed only by database users that belong to a group with a "GROUP_ID" that matches the value stored in the "MANAGER_ID" column (column 228) of table 220 (the "employees" table).

Suppose now that user John Doe uses client 202 to send the following query "Q1" to database server 204:

Q1: select name, phone, salary from employees

As indicated by reference numeral 203, client 202 sends query "Q1" to database server 204. Based on the security context associated with client 202, database server 204 determines the database user ID of user John Doe. For example, in order to use client 202 to connect to database server 204, John Doe may have provided the client with valid username and password. Client 202 uses the username and password to establish a connection to database server 204. On its end, database server 204 uses the username and password to determine the database user ID of John Doe, and then keeps this user ID associated with the established connection for its duration. Based on the determined user ID, database server 204 also determines the IDs of any groups to which John Doe is assigned. In the particular example of FIG. 2, database server 204 determines that among other groups, user John Doe is assigned to a group with a group ID of "103", which group includes managers in a particular line of management.

Thereafter, query engine 206 compiles and executes query "Q1" against database 210, as indicated by reference numeral 209. In response to the execution of query "Q1", query engine 206 retrieves row set 260 as indicated by reference numeral 257. Row set 260 includes all rows in table 220 that satisfy the criteria specified in query "Q1". In an example implementation, query engine 206 may store row set 260 in a buffer that is implemented in volatile memory, persistent storage, or a combination thereof.

Row set 260 includes columns 224A, 226B, and 230A, which store data from the corresponding columns 224, 226, and 230 of table 220. As illustrated in FIG. 2, row set 260 includes the salary data in column 230A for all rows from table 220 which satisfied query "Q1", despite the fact that user John Doe may not have sufficient permissions to view the salaries of all employees represented by the retrieved rows. (The ellipsis in row set 260 indicate that other rows may have also satisfied query "Q1".)

According to the techniques described herein, before any data from row set 260 is sent to client 202 in response to query "Q1", extended security logic 208 applies security policy 240 to each row of row set 260 in order to generate row set 270. Row set 270 is the row set that is to be returned to client 202, and includes columns 224B, 226B, and 230B that store data based on the corresponding columns 224A, 226A, and 230A of row set 260. In some implementations, extended security logic 208 may generate row set 270 by directly manipulating the data in the buffer that stores row set 260; in other implementations, query engine 206 may allocate a separate buffer for row set 270 and may generate that row set by copying data from the buffer that stores row set 260.

For each row in row set 260, extended security logic 208 evaluates the condition employees.MANAGER_ID=GROUP_ID specified in security policy 240, where "103" is the value used for "GROUP_ID" as determined by database server 204. For example, extended security logic 208 determines that the above condition is satisfied for the rows in row set 260 that represent employees "Jane Row", "Tom Burns", and "Ed Becks" because the corresponding rows in table 220 store the value "103" in the "MANAGER_ID" column. This indicates that user John Doe has permissions to view the salary data for these employees, and for this reason extended security logic 208 includes the salary data stored in column 230A of row set 260 for these employees in the corresponding rows of row set 270.

Extended security logic 208 determines that the above condition is not satisfied for the rows in row set 260 that represent employees "Jim Smith", "Jenny Sims", and "Allie Gray" because the corresponding rows in table 220 store a value different than "103" in the "MANAGER_ID" column. This indicates that user John Doe does not have permissions to view the salary data for these employees. According to the techniques described herein, for these employees extended security logic 208 replaces with security-NULL values the salary data stored in column 230A of row set 260 in the corresponding rows of row set 270. In FIG. 2, these security-NULL values are denoted as "NULL#" in column 230B of row set 270. (It is noted that while table 220 stores a NULL value for the salary of employee "Allie Gray", row set 270 stores a security-NULL value in column 230B for that employee because according to security policy 240 user John Doe has no permissions to view the salary data for that employee.)

In this manner extended security logic 208 evaluates security policy 240 for each row in row set 260 and generates row set 270. Thereafter, in response to query "Q1", query engine 206 sends row set 270 to client 202 as indicated by reference numeral 267.

When client 202 receives row set 270, client 202 may present the data in the row set to user John Doe. In some embodiments, client 202 may additionally check the received row set 270 for any security-NULL values stored therein. If such security-NULL values are detected, client 202 may take appropriate actions for presenting these values to the user— for example, by displaying an appropriate visual representation for these values such as "NULL#".

Additional Features and Alternative Embodiments

In some embodiments, the techniques described herein allow for support of referential integrity at the database application level. For example, a database application may need to perform a join of two or more tables, one of which has column-level security policies defined for its columns. The database application would not need to address the problem of breaking the referential integrity of the join operation— e.g., that some rows in the result set of rows may be left out because a joined row may include columns for which a column-level security policy is not satisfied. Since the techniques described herein provide for a database server that applies column-level security policies after retrieving from the database the set of rows specified in a query, the database application would always be able to perform a join to a table having columns with a column-level security policy and still obtain the correct number of rows in result set of rows. At the same time, the database application would be prevented by the database server from providing unauthorized access to data values stored in the columns for which the column-level security policies are defined.

The techniques described herein also provide for a single table to store the values of attributes that are grouped in different security policies and/or levels. For example, a single "order_items" table can include one set of columns that store data that should be accessed only by marketing personnel, one set of columns that should be accessed only by order processing personnel, and one set of columns that should be accessed only by engineering personnel. When according to the techniques described herein each set of columns is associated with the appropriate column-level security policies, a database application that provides access to the "order_items" table does not need to address the problem of generating specific queries (or using specific views) for each specific set of columns. Rather, upon sending to a database server a query to retrieve data from the entire table, the database application would receive from the database server the result set of rows that is proper based on the user context associated with the query, where the values in the sets of columns which the user context does not have permission to access would be replaced by security-NULL values.

The techniques described herein also provide for normalized implementation of the security policies themselves. Suppose that the following security policy needs to be implemented against an employee table that stores both sensitive data and non-sensitive data in its columns:

"An employee's Social Security Number may be viewed by the employee's line management, or by their HR Representative. An employee's phone number may be viewed by any other employee."

In a prior approach, the above security policy needed to be re-implemented in every user interface, report-generating application, or other program that referenced the employee table. This caused the security policy to be redundantly coded numerous times, or even inadvertently missed or coded incorrectly. In contrast, the techniques described herein provide for a database server that is operable to enforce the security policy centrally at the database level, thus allowing any user interface, report-generating application, and other program that references the employee table to implement the security policy without any additional and/or incorrect coding of the policy itself.

Example of Rules for Attaining Secure Normal Forms

By providing for a database server that is operable to enforce column-level security policies in combination with other database security mechanisms at the database level, the techniques described herein also allow for mechanisms and rules for designing relational database tables in a secure normal form. An example normalization mechanism may be described based on the following rules.

First Normal Form (1NF) sets the basic rules for an organized database as follows:
  Eliminate duplicative columns from the same table.
  Create separate tables for each group of related data and identify each row with a unique column or set of columns (the primary key).

Second Normal Form (2NF) further addresses the concept of removing duplicative data. The rules of 2NF can be summarized as follows:
  Meet all the requirements of the 1NF.
  Remove subsets of data that apply to multiple rows of a table and place them in separate tables.
  Create relationships between these new tables and their predecessors through the use of foreign keys.

For example, if an Order Header data and Order Header Revisions data are implemented in the same table, some columns would be constant (or the same) over all of the revisions of an order header, which would violate 2NF.

Third Normal Form (3NF) goes one step further to ensure that all columns in a table are functionally dependent only on the entire set of key columns. The rules of 3NF can be summarized as follows:
  Meet all the requirements of the 2NF.
  Remove columns that are not dependent upon the primary key.

To test whether a 2NF table is also in 3NF, the question "Are any of the non-key columns dependent on any other non-key columns?" may be asked. If the answer is in the affirmative, then the table is not in 3NF.

While a database normalization process including 1NF, 2NF, and 3NF can be used to model real-world information efficiently and without redundancies, such process cannot be used to model security policies for accessing this information. Conventional techniques typically implement security policies externally and redundantly in each user interface, application, or tool that has direct access to data in a relational database.

In contrast, the techniques described herein allow security policies (including column-level security policies) to be implemented centrally by a database server. Thus, the techniques described herein allow a security policy itself to be normalized so that there are no redundant expressions and implementations of the security policy in various interfaces, applications, and tools that have direct access to relational data. This process of normalizing security policies (in addition to the normalization of the attribute information into 1NF, 2NF, and/or 3NF) is referred to herein as a "Secure Normal Form" (SNF). An additional benefit of modeling data in SNF is that a database designer or developer does not have to break a 3NF information model in order to implement security policies using traditional table-level permissions.

According to the techniques described herein, the following rules may be used to achieve a Secure Normal Form (SNF):

Meet all the requirements of the 3NF.

Store the information in one or more separately securable objects to which different security policies, including column-level security policies, may be separately defined and applied.

For example, if a customer table is implemented to include personally identifiable data in the same securable object (e.g., a database table to which column-level security policies cannot be applied) as terms of sale, then this would violate SNF. Examples of separately securable objects include columns, tables, views, and other database objects or containers that may be separately associated with different types of security policies.

Hardware Overview

Figure 3:
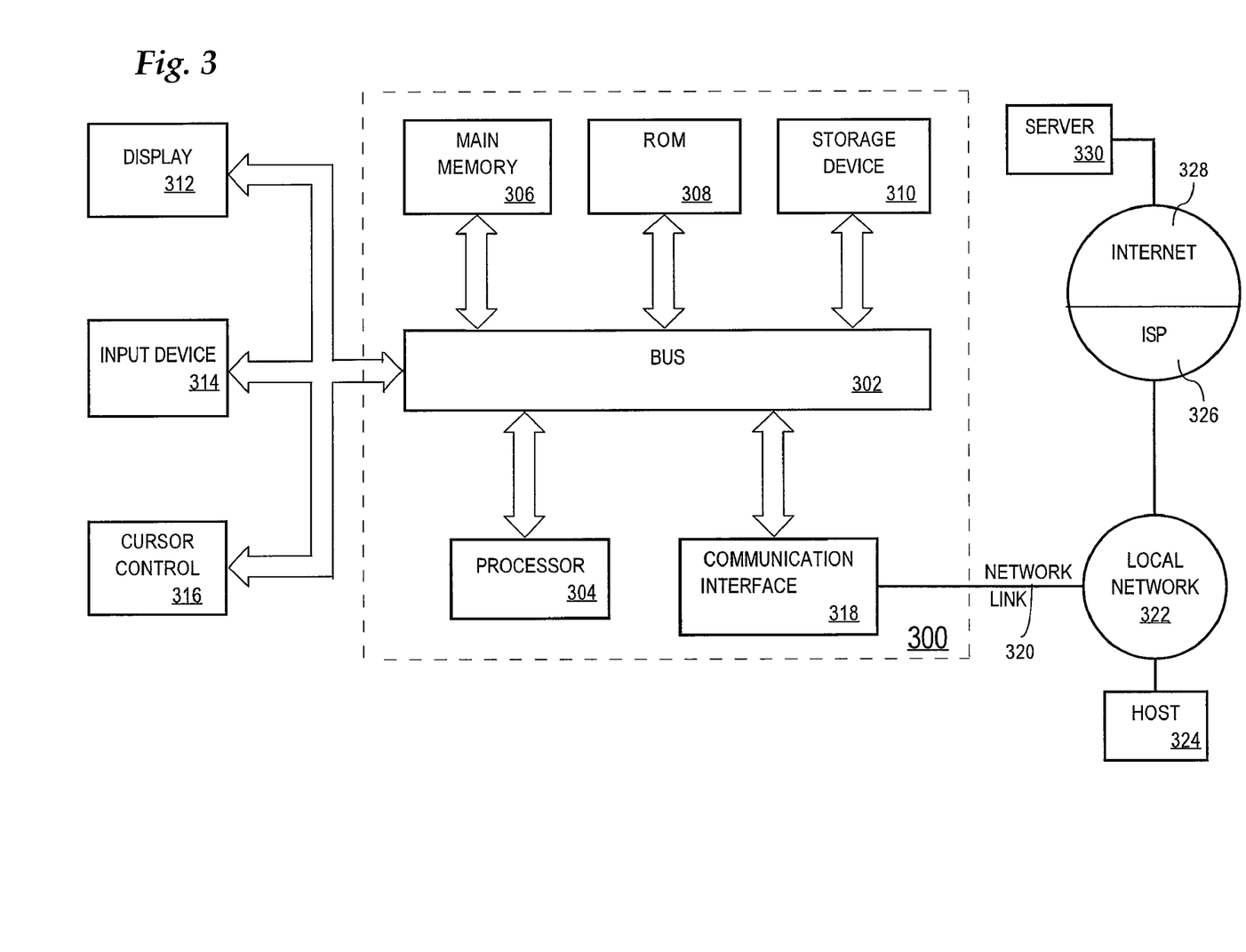
FIG. 3 is a block diagram that illustrates a computer system upon which an embodiment may be implemented.

FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer system to operation in a specific fashion. In an embodiment implemented using computer system 300, various computer-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a computer.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    at a database server, receiving from a client a query requesting data that is stored at least in part in a particular column of a table in a database managed by the database server;
    wherein the database includes a security policy that is defined for the particular column of one or more particular rows stored in the table;
    at the database server, processing the query and retrieving a set of rows from the database, wherein each row of the set of rows includes the particular column of the table;
    after retrieving the set of rows and before sending a result set of rows to the client, at the database server modifying the set of rows into the result set of rows by applying the security policy to said each row of the set of rows, wherein applying the security policy to said each row comprises:
        determining whether the security policy is satisfied for the particular column of said each row;
        replacing, in the result set of rows, a data value in the particular column of said each row with a security-NULL value when the security policy is not satisfied for the particular column of said each row; and
        including the data value in the particular column of said each row into the result set of rows when the security policy is satisfied for the particular column of said each row; and
    wherein both invoking the security policy and the step of replacing are not a result of rewriting the query;
    after modifying the set of rows into the result set of rows, at the database server returning the result set of rows to the client;
    wherein the method is performed by one or more computing devices.

2. The method of claim 1, wherein:
    the security policy comprises metadata that specifies one or more conditions, wherein the one or more conditions indicate permissions for accessing one or more data values in the particular column of the one or more particular rows stored in the table; and
    determining whether the security policy is satisfied comprises evaluating the one or more conditions for the particular column of said each row.

3. The method of claim 2, wherein the permissions for accessing the one or more data values are associated with one or more roles that are assigned to one or more users of the database.

4. The method of claim 2, wherein the metadata of the security policy is stored in one or more database objects that are stored in the database.

5. The method of claim 1, wherein the one or more particular rows are a subset of all rows stored in the table.

6. The method of claim 1, wherein processing the query comprises executing the query without semantically modifying the query to retrieve different data than the data specified in the query.

7. The method of claim 1, wherein the security policy is further defined, in the database, for one or more other columns of one or more other rows that are stored in one or more other tables.

8. The method of claim 1, wherein:
    the table includes a second column that is different than the particular column;
    the database includes a second security policy that is defined for the second column of one or more second rows stored in the table;
    said each row of the set of rows includes the second column of the table; and
    modifying the set of rows into the result set of rows further comprises applying the second security policy to said each row of the set of rows, wherein applying the second security policy to said each row comprises:
        determining whether the second security policy is satisfied for the second column of said each row;
        replacing, in the result set of rows, a second data value in the second column of said each row with the security-NULL value when the second security policy is not satisfied for the second column of said each row; and
        including the second data value in the second column of said each row into the result set of rows when the second security policy is satisfied for the second column of said each row.

9. The method of claim 1, wherein:
    the query further requests data that is stored in a second column of a second table in the database;
    the database includes a second security policy that is defined for the second column of one or more second rows stored in the second table;
    said each row of the set of rows includes the second column of the second table; and
    modifying the set of rows into the result set of rows further comprises applying the second security policy to said each row of the set of rows, wherein applying the second security policy to said each row comprises:
        determining whether the second security policy is satisfied for the second column of said each row;

replacing, in the result set of rows, a second data value in the second column of said each row with the security-NULL value when the second security policy is not satisfied for the second column of said each row; and
including the second data value in the second column of said each row into the result set of rows when the second security policy is satisfied for the second column of said each row.

10. The method of claim 1, wherein modifying the set of rows into the result set of rows is performed by a query engine included in the database server.

11. A computer-readable storage medium storing one or more sequences of instructions which, when executed by one or more processors, cause a database server to perform:
receiving from a client a query requesting data that is stored at least in part in a particular column of a table in a database managed by the database server;
wherein the database includes a security policy that is defined for the particular column of one or more particular rows stored in the table;
processing the query and retrieving a set of rows from the database, wherein each row of the set of rows includes the particular column of the table;
after retrieving the set of rows and before sending a result set of rows to the client, modifying the set of rows into the result set of rows by applying the security policy to said each row of the set of rows, wherein applying the security policy to said each row comprises:
determining whether the security policy is satisfied for the particular column of said each row;
replacing, in the result set of rows, a data value in the particular column of said each row with a security-NULL value when the security policy is not satisfied for the particular column of said each row; and
including the data value in the particular column of said each row into the result set of rows when the security policy is satisfied for the particular column of said each row; and
wherein both invoking the security policy and the step of replacing are not a result of rewriting the query;
after modifying the set of rows into the result set of rows, returning the result set of rows to the client.

12. The computer-readable storage medium of claim 11, wherein:
the security policy comprises metadata that specifies one or more conditions, wherein the one or more conditions indicate permissions for accessing one or more data values in the particular column of the one or more particular rows stored in the table; and
the instructions that cause the database server to perform determining whether the security policy is satisfied comprise instructions which, when executed by the one or more processors, cause the database server to perform evaluating the one or more conditions for the particular column of said each row.

13. The computer-readable storage medium of claim 12, wherein the permissions for accessing the one or more data values are associated with one or more roles that are assigned to one or more users of the database.

14. The computer-readable storage medium of claim 12, wherein the metadata of the security policy is stored in one or more database objects that are stored in the database.

15. The computer-readable storage medium of claim 11, wherein the one or more particular rows are a subset of all rows stored in the table.

16. The computer-readable storage medium of claim 11, wherein the instructions that cause the database server to perform processing the query comprise instructions which, when executed by the one or more processors, cause the database server to perform executing the query without semantically modifying the query to retrieve different data than the data specified in the query.

17. The computer-readable storage medium of claim 11, wherein the security policy is further defined, in the database, for one or more other columns of one or more other rows that are stored in one or more other tables.

18. The computer-readable storage medium of claim 11, wherein:
the table includes a second column that is different than the particular column;
the database includes a second security policy that is defined for the second column of one or more second rows stored in the table;
said each row of the set of rows includes the second column of the table; and
the instructions that cause the database server to perform modifying the set of rows into the result set of rows further comprise instructions which, when executed by the one or more processors, cause the database server to perform applying the second security policy to said each row of the set of rows, wherein applying the second security policy to said each row comprises:
determining whether the second security policy is satisfied for the second column of said each row;
replacing, in the result set of rows, a second data value in the second column of said each row with the security-NULL value when the second security policy is not satisfied for the second column of said each row; and
including the second data value in the second column of said each row into the result set of rows when the second security policy is satisfied for the second column of said each row.

19. The computer-readable storage medium of claim 11, wherein:
the query further requests data that is stored in a second column of a second table in the database;
the database includes a second security policy that is defined for the second column of one or more second rows stored in the second table;
said each row of the set of rows includes the second column of the second table; and
the instructions that cause the database server to perform modifying the set of rows into the result set of rows further comprise instructions which, when executed by the one or more processors, cause the database server to perform applying the second security policy to said each row of the set of rows, wherein applying the second security policy to said each row comprises:
determining whether the second security policy is satisfied for the second column of said each row;
replacing, in the result set of rows, a second data value in the second column of said each row with the security-NULL value when the second security policy is not satisfied for the second column of said each row; and
including the second data value in the second column of said each row into the result set of rows when the second security policy is satisfied for the second column of said each row.

20. The computer-readable storage medium of claim 11, wherein the instructions that cause the database server to perform modifying the set of rows into the result set of rows are included in a query engine that is operable under the control of the database server.

21. The method of claim 1, wherein the security policy is defined in terms of one or more entity attributes, further comprising:
- at the database server, determining that the particular column stores data represented by the one or more entity attributes;
- in response to determining that the particular column stores data represented by the one or more entity attributes, at the database server, mapping the security policy to the particular column.

22. The computer-readable storage medium of claim 11, wherein:
- the security policy is defined in terms of one or more entity attributes; and
- the one or more sequences of instructions further comprise instructions which, when executed by the one or more processors, cause the database server to perform:
  - determining that the particular column stores data represented by the one or more entity attributes;
  - in response to determining that the particular column stores data represented by the one or more entity attributes mapping the security policy to the particular column.

* * * * *